United States Patent

Sova

[11] Patent Number: 5,180,136
[45] Date of Patent: Jan. 19, 1993

[54] COUNTERBALANCE MECHANISM

[75] Inventor: Alan Sova, Jamestown, N.Y.

[73] Assignee: Weber-Knapp Company, Jamestown, N.Y.

[21] Appl. No.: 746,880

[22] Filed: Aug. 19, 1991

[51] Int. Cl.⁵ .......................................... F16M 13/00
[52] U.S. Cl. ................................ 248/576; 248/280.1; 248/281.1
[58] Field of Search ...................... 248/589, 581, 281.1, 248/280.1, 575, 576, 585, 586, 421, 566, 592, 593, 595

[56] References Cited

U.S. PATENT DOCUMENTS

| | | | |
|---|---|---|---|
| 2,131,693 | 9/1938 | Smith | 88/24 |
| 3,426,190 | 2/1969 | Bobrick | 240/73 |
| 4,160,536 | 7/1979 | Krogsrud | 248/280.1 |
| 4,291,857 | 9/1981 | Totter et al. | 248/585 X |
| 4,320,884 | 3/1982 | Leo | 248/276 |
| 4,447,031 | 5/1984 | Souder, Jr. et al. | 248/280.1 |
| 4,589,621 | 5/1986 | Hunt et al. | 248/421 X |
| 4,834,329 | 5/1989 | Delapp | 248/280.1 X |
| 4,846,434 | 7/1989 | Krogsrud | 248/281.1 X |

FOREIGN PATENT DOCUMENTS

| | | | |
|---|---|---|---|
| 1530754 | 6/1969 | Fed. Rep. of Germany | 248/586 |
| 903116 | 8/1962 | United Kingdom | 248/585 |

Primary Examiner—David L. Talbott
Attorney, Agent, or Firm—Bean, Kauffman & Spencer

[57] ABSTRACT

A counterbalance mechanism including a pair of interconnected parallelogram linkages provided with counterbalance springs, and an adjustment for simultaneously controlling the counterbalance effect of the springs.

8 Claims, 2 Drawing Sheets

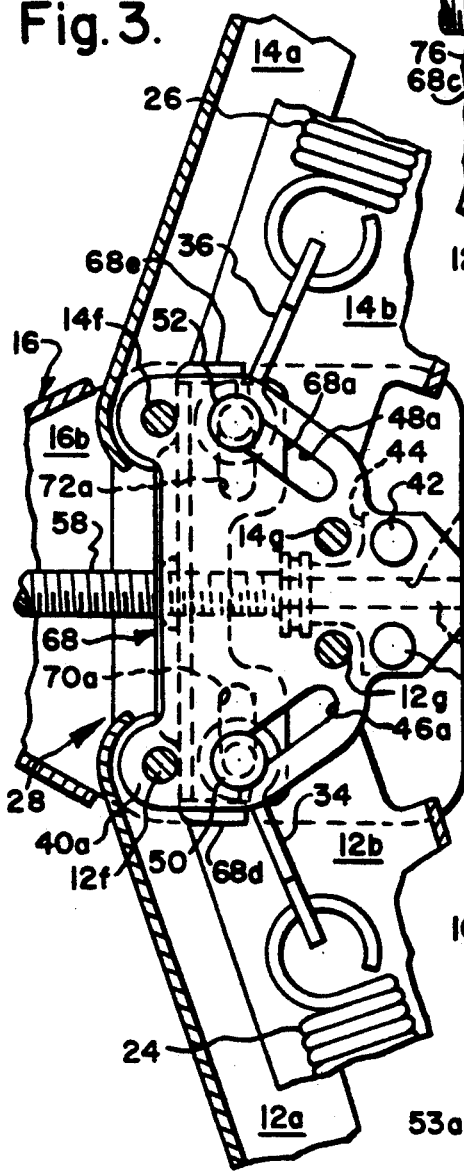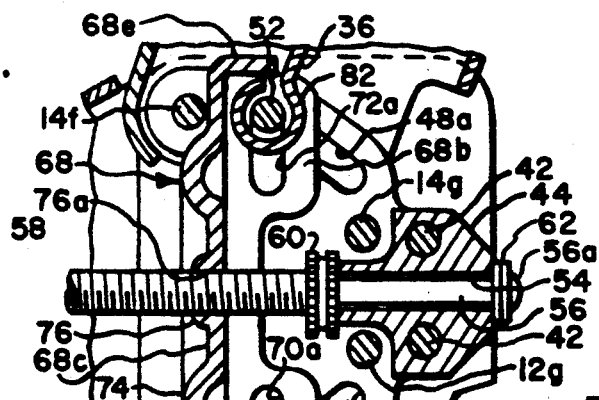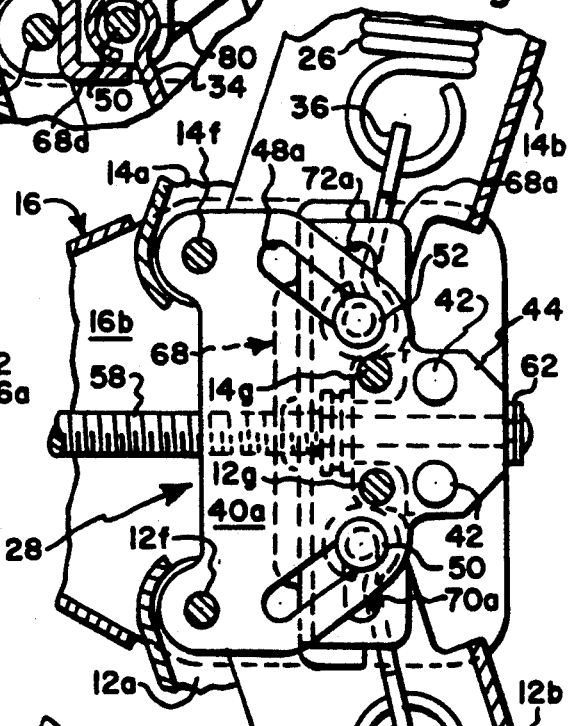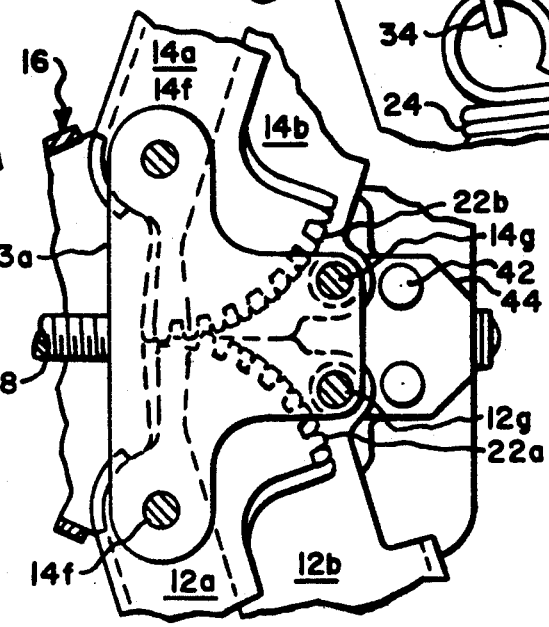

COUNTERBALANCE MECHANISM

BACKGROUND OF THE INVENTION

Counterbalance mechanisms including a pair of interconnected parallelogram linkages, which are provided with counterbalance springs, are known, as evidenced by U.S. Pat. Nos. 2,131,693; 3,426,190 and 4,447,031. In U.S. Pat. No. 4,447,031, the counterbalance springs are individually adjustable.

SUMMARY OF THE INVENTION

The present invention is directed towards a counterbalance mechanism of the type having a pair of interconnected parallelogram linkages fitted with counterbalance springs, and more particularly to a counterbalance mechanism of this type, wherein adjustment means are provided to simultaneously adjust the counterbalance effect of the springs of both linkages.

In accordance with the present invention, a common end or coupling link, which serves to interconnect a pair of parallelogram linkages each fitted with a counterbalance spring, encloses an adjustment mechanism including a slide bracket mounted for movement relative to fixed mounting plates under the control of an exteriorly mounted control knob for purposes of effecting movement of bearing pins to which relative adjacent ends of the counterbalance springs are attached, whereby to simultaneously adjust the counterbalance effects of such springs.

BRIEF DESCRIPTION OF THE DRAWINGS

The nature and mode of operation of the present invention will now be more fully described in the following detailed description taken with the accompanying drawings wherein:

FIG. 3 is a sectional view taken generally along the line 3—3 in FIG. 2 and showing one limit of spring adjustment; and FIG. 4 is a view similar to FIG. 3, but showing an opposite limit of spring adjustment;

FIG. 5 is a sectional view taken generally along the line 5—5 in FIG. 2; and

FIG. 6 is a sectional view taken generally along the line 6—6 in FIG. 2.

DETAILED DESCRIPTION

Figure 1:
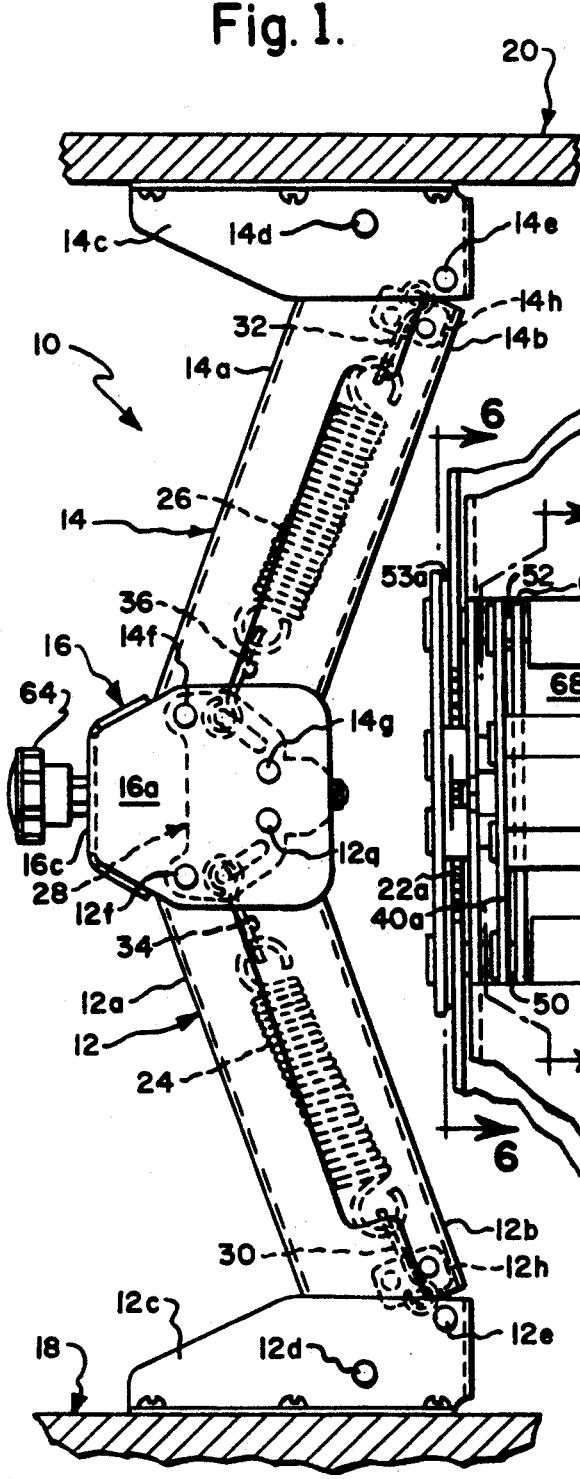
FIG. 1 is a side elevational view of a counterbalance mechanism incorporating the present invention.

A counterbalance mechanism formed in accordance with the present invention is generally designated as 10 in FIG. 1. Mechanism 10 is conventional from the standpoint that it includes a pair of interconnected parallelogram linkages 12 and 14 having elongated front side links 12a,14a and rear side links 12b,14b, respectively; distal end links 12c and 14c pivotally connected to the ends of their associated side links 12a,12b and 14a,14b by pivot pins 12d,12e and 14d,14e, respectively; and a common adjacent end or connecting link 16 pivotally connected to side links 12a,12b and 14a,14b by pivot pins 12f,12g and 14f,14g, respectively. Preferably, side links 12a,12b and 14a,14b are of U-shaped cross-sectional configuration, wherein links 12b and 14b are partially nested or received within links 12a and 14a; end link 12c is configured to permit it to be fixed to a suitable support for mechanism 10, such as a table top 18; end link 14c is configured to permit it to support a desired art device, such as a shelf 20 adapted in turn to support a CRT or keyboard, not shown, whose vertical position relative to the table top is desired to be adjusted; and connecting link 16 is of a U-shaped configuration defined by opposite leg flanges 16a and 16b, and a front or connecting flange 16c. It is also preferable to operably interconnect the adjacent ends of links 12a and 14a, as by meshing arcuate toothed sections 22a and 22b best shown in FIG. 6, to insure uniformity of operation of linkages 12 and 14 during vertical movements of shelf 20.

In accordance with the present invention, counterbalance springs 24 and 26 are associated with linkages 12 and 14 for the purpose of counterbalancing the weight thereof and an art device supported by end link 14c, and an adjustment means 28 is associated with connecting link 16 for the purpose of adjusting the counterbalance effect produced by at least one and preferably both of springs 24 and 26. For purposes of illustration, springs 24 and 26 are shown as being in the form of multiple coil type tension springs having first or distal ends pivotally coupled by common connector links 30 and 32 to mounting brackets 12h and 14h fixed inwardly of side links 12b and 14b, respectively, and second or adjacent ends pivotally coupled by common connector links 34 and 36 to adjustment means 28 in the manner to be described with reference to FIGS. 3 and 4. It will be understood, however, that the invention is not limited to the use of tension springs, since by a rearrangement of parts, it would be possible to employ suitable compression type springs, such as gas cylinders, to produce a desired counterbalancing effect.

Figure 2:
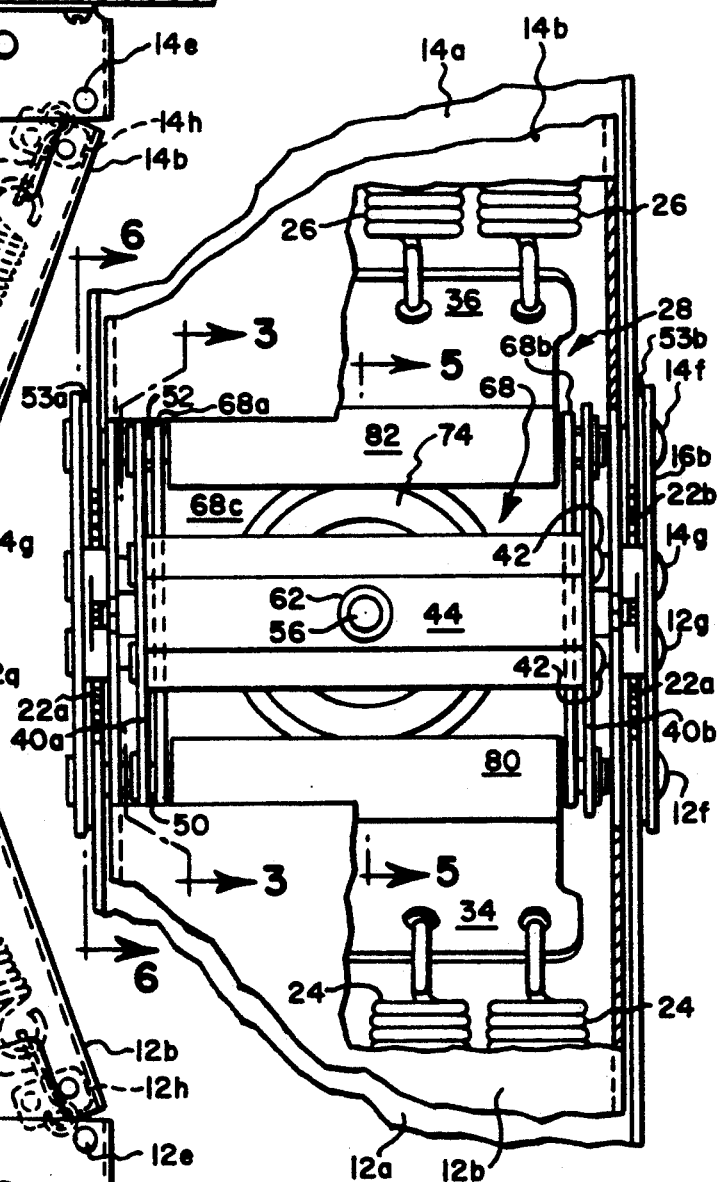
FIG. 2 is a fragmentary, enlarged view, as viewed from the right in FIG. 1.

Adjustment means 28 is shown in FIGS. 2-4 as including a pair of parallel mounting plates 40a and 40b, which are arranged inwardly of the adjacent ends of side links 12b and 14b, as shown in FIG. 2, and apertured to receive pivot pins 12f,12g, 14f and 14g, as shown for the case of mounting plate 40a in FIGS. 3 and 4, thereby to positionally fix the mounting plates within connecting link 16. Mounting plates 40a and 40b are also apertured to receive opposite ends of a pair of mounting pins 42,42 by which the facing surfaces of the mounting plates are clamped against opposite parallel ends of an elongated bearing bar 44; and formed with lower or and 48a only for the case of mounting plate 40a in FIGS. 3 and 4, which are arranged to converge rearwardly towards the bearing bar and sized to slidably receive opposite ends of lower or first and upper or second bearing pins 50 and 52. Preferably, a pair of spacer plates 53a and 53b, which are apertured to receive pivot pins 12f, 12g, 14f and 14g, are provided to space the side flanges of side links 12a and 14a relative to the facing inner surfaces of connecting link leg flanges 16a and 16b, as best shown in FIG. 2.

Bearing bar 44 is formed with a bearing opening 54, which is arranged midway between its opposite ends to extend normal to a vertical plane passing through the axes of mounting pins 42,42. Bearing opening 54 is sized to freely rotatably receive a reduced diameter, cylindrically shaped rear end projection 56 of a screw threaded adjustment screw 58. Projection 56 is constrained against axial movement relative to bore opening 54 by suitable thrust bearing 60 and bearing washers 62 suitably maintained in position, as by peening over the free end 56a of the projection. The forward or opposite free end of adjustment screw 58 freely extends forwardly through an aperture, not shown, formed in connecting link front flange 16c for attachment to a manual control knob 64 located exteriorly of connecting link 16.

Adjustment means 28 additionally includes a slide bracket 68 of generally box-shaped configuration defined by a pair of parallel side plates 68a and 68b, which are arranged parallel to and inwardly of mounting plates 40a and 40b and formed with aligned, vertically elongated lower or first and upper or second guide slots 70a and 72a sized to slidably receive lower and upper bearing pins 50 and 52 adjacent their opposite ends; a generally rectangular front or connecting plate 68c; which is joined to vertical front edges of side plates 68a and 68b, and formed to provide a circular strengthening embossment 74 and a centrally arranged generally cylindrical embossment 76 having threaded opening 76a for threadably receiving adjustment screw 58; and lower and upper strengthening plates 68d and 68e, which are joined to the horizontal lower and upper edges of front plate 68c, respectively.

Connector links 34 and 36 are formed with curls 80 and 82, which are internally sized to rotatably receive central portions of bearing pins 50 and 52, respectively, and lengthwise sized to be received intermediate facing surfaces of slide bracket side plates 68a and 68b for free swinging and sliding movement relative thereto. Engagement of the ends of curls 80 and 82 with the facing inner surfaces of side plates 68a and 68b and/or the sliding engagement of the side plates with mounting plates 40a and 40b serves to constrain slide bracket 68 against rotation with adjustment screw 58, while permitting reciprocating movement of the slide bracket axially thereof.

In operation, mechanism 10 would be fitted with springs 24 and 26 whose number and/or size is determined by the expected loading condition to be applied to end link 14c during normal use. Thereafter, a user may selectively make adjustments to the counterbalancing effect achievable with the previously installed springs by imparting oppositely directed rotations to control knob 64. As will be apparent, rotations of control knob 64 will impart rotations to adjustment screw 58, which in turn imparts reciprocating movements to slide bracket 68 between the first and second limiting or opposite end positions shown in FIGS. 3 and 4, respectively. Incident to reciprocating movements of slide bracket 68, engagement of the ends of bearing pins 50 and 52 with the sloping or rearwardly converging side walls of slots 46a and 48a and with the vertically extending side walls of slots 70a and 72a, causes the bearing pins to undergo sliding movements lengthwise within the slots and both horizontal and vertical displacements relative to pivot pins 12f,14f and 12g,14g. As bearing pins 50 and 52 are moved relatively towards pivot pins 12g and 14g, the moment arms through which the biases of springs 24 and 26 act about such pivot pins is reduced with the result that the counterbalance effect or moment exerted by the springs on linkages 12 and 14 is also reduced. The change in spring bias or force resulting from the slight change in the lengths of springs 24 and 26, which occurs incident to movement of bearing pins 50 and 52 between their limiting positions, is relatively small and, thus, has little affect on the counterbalance effect of the springs. Thus, in the illustrated construction, springs 24 and 26 produce maximum and minimum counterbalance effects on linkages 12 and 14, when bearing pins are in their first and second limiting positions, respectively.

The first and second limiting positions may be defined by engagement of bearing pins 50 and 52 with the opposite ends of slots, as indicated in FIGS. 3 and 4.

What is claimed is:

1. A counterbalance mechanism comprising:
   a pair of parallelogram linkages having interconnected adjacent ends and distal ends;
   a pair of counterbalance spring means having adjacent ends and distal ends connected one to each of said distal ends of said linkages;
   adjustment means carried by said interconnected adjacent ends for simultaneously controlling the positions of said adjacent ends of said spring means for adjusting the counterbalance effects of said spring means on said linkages.

2. A mechanism according to claim 1, wherein said interconnected adjacent ends of said linkages include a common end link enclosing said adjustment means, and said adjustment means is operated by a manual control knob disposed exteriorly of said common link.

3. A mechanism according to claim 1, wherein said interconnected adjacent ends of said linkages include pivot pins about which said spring means act to produce said counterbalance effects; and said adjustment means includes mounting means, slide means constrained of reciprocating movement relative to said mounting means, bearing pins connected to said adjacent ends of said spring means, and means to effect reciprocating movement of said slide means, said mounting means and said slide means having slots for receiving said bearing pins and cooperating upon reciprocating movement of said slide means to effect movement of said bearing pins relatively towards and away from said pivot pins.

4. A mechanism according to claim 3, wherein said interconnected adjacent ends of said linkages include a common end link mounting said pivot pins and enclosing said mounting means, said slide means and said bearing pins, and said means to effect reciprocating movement of said slide means includes an advancement screw threadbly connected to said slide means, said screw having a free end extending exteriorly of said common end link and attached to a control knob for effecting rotation of said screw.

5. A mechanism according o claim 3, wherein said mounting means is carried on said pivot pins, said means to effect reciprocating movement of said slide means includes an adjustment screw having one end journalled on said mounting means, an opposite end having a control knob for effecting rotation of said screw and an intermediate portion threadably connected to said slide means.

6. A counterbalance mechanism comprising:
   a pair of parallelogram linkages having adjacent ends defined by a common connecting link, opposite end links and side links opposite end connected to said common connecting link and opposite end links by pivot pins;
   a pair of counterbalance spring means associated one with each of said linkages, each of said spring means having first ends connected to said linkages adjacent said opposite end links and second ends arranged adjacent to said common connecting link; and
   adjustment means for simultaneously moving said second ends of said spring means relative to said pivot pins connecting said side links to said common connecting link for adjusting the counterbalance effect of said spring means on said linkages.

7. A mechanism according to claim 6, wherein said adjustment means includes mounting means fixed relative to said common connecting link, slide means constrained for reciprocating movement relative to said mounting means, bearing pins connected to said second ends of said spring means and means to effect reciprocating movement of said slide means, said mounting means and said slide means having slots for receiving said bearing pins and cooperating upon reciprocating movement of said slide means to effect movement of said bearing pins relatively towards and away from said pivot pins connecting said side links to said common connecting link.

8. A mechanism according to claim 6, wherein said common connecting link has opposite flanges through which extend said pivot pins connecting said side links to said common connecting link and a front flange connecting said opposite flanges; and said adjustment means includes a pair of mounting plates mounted on said pivot pins connecting said side links to said common connecting link inwardly of facing surfaces of said opposite flanges, said mounting plates having first and second guide slots, bearing means fixed to said mounting plates, an adjustment screw having one end rotatably supported by said bearing means and an opposite end freely projecting outwardly through said front flange for attachment to a manual control knob adapted to impart rotations to said screw relative to said bearing means, a slide bracket having a pair of side plates disposed adjacent facing surfaces of said mounting plates and a connecting plate threadably coupled to said screw, said slide bracket being constrained against rotation with said screw while being movable axially of said screw upon rotation thereof, said side plates having first and second guide slots, a first bearing pin having opposite ends thereof slidably received within said first guide slots of said mounting plates and said side plates, a second bearing pin having opposite ends thereof slidably received within said second guide slots of said mounting plates and said side plates, said bearing pins being connected one to each of said second ends of said spring means, said first and second guide slots of said mounting plates being inclined relative to said first and second guide slots of said side plates, whereby upon movement of said side bracket in opposite directions axially of said screw, said bearing pins are caused to move between first and second limiting positions wherein said bearing pins are disposed in differing spacings from said pivot pins.

* * * * *

UNITED STATES PATENT AND TRADEMARK OFFICE
CERTIFICATE OF CORRECTION

PATENT NO. : 5,180,136
DATED : January 19, 1993
INVENTOR(S) : Alan W. Sova

It is certified that error appears in the above-identified patent and that said Letters Patent is hereby corrected as shown below:

Col. 2, line 47 - after "or", insert --first and upper or second elongated guide slots, shown at 46a--.

Col. 2, line 65 - before "suitable", insert --a--.

Col. 4, line 25 - "of" should be --for--.

Col. 4, line 39 - "advancement" should be --adjustment--.

Col. 4, line 40 - "threadbly" should be --threadably--.

Col. 6, line 20 - "side" should be --slide--.

Signed and Sealed this

Ninth Day of November, 1993

Attest:

BRUCE LEHMAN

Attesting Officer

Commissioner of Patents and Trademarks